Figure 3:
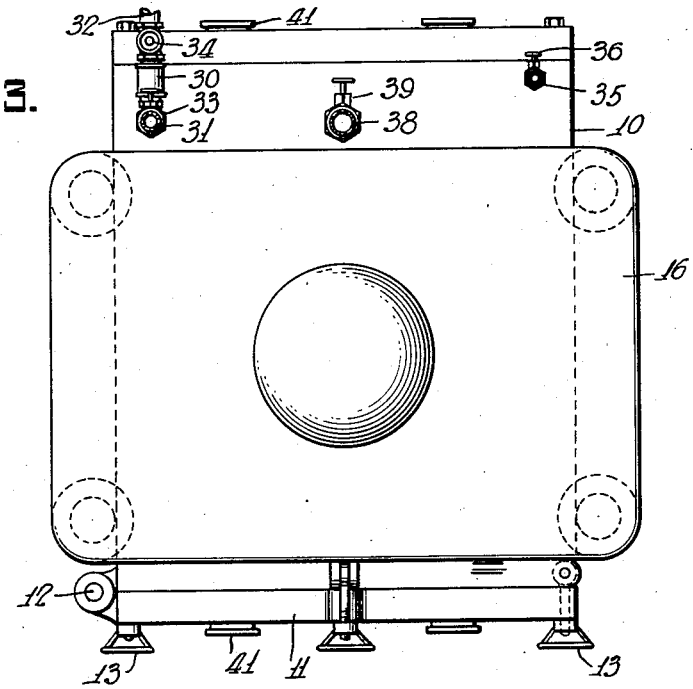

May 1, 1934.　　　　　S. I. COLE　　　　　1,956,916
APPARATUS FOR MANUFACTURING ELECTRICAL CONDENSERS
Filed Dec. 19, 1929　　3 Sheets-Sheet 1
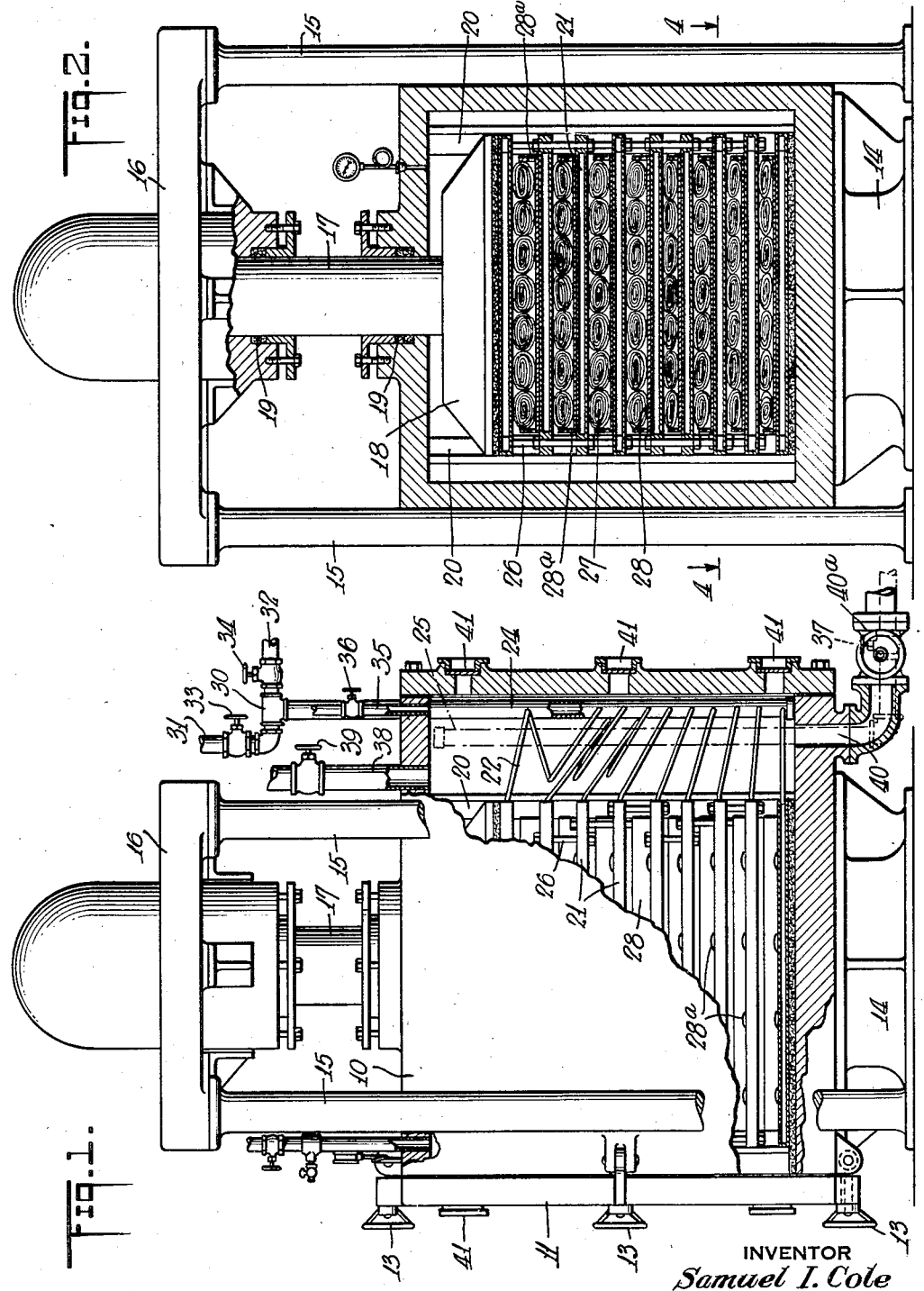
INVENTOR
Samuel I. Cole
BY
ATTORNEYS May 1, 1934.  S. I. COLE  1,956,916
APPARATUS FOR MANUFACTURING ELECTRICAL CONDENSERS
Filed Dec. 19, 1929   3 Sheets-Sheet 2

INVENTOR
Samuel I. Cole
BY
ATTORNEYS

May 1, 1934. S. I. COLE 1,956,916

APPARATUS FOR MANUFACTURING ELECTRICAL CONDENSERS

Filed Dec. 19, 1929   3 Sheets-Sheet 3

INVENTOR
Samuel I. Cole
BY
ATTORNEYS

Patented May 1, 1934

1,956,916

UNITED STATES PATENT OFFICE 1,956,916

APPARATUS FOR MANUFACTURING ELECTRICAL CONDENSERS

Samuel Isidor Cole, Brooklyn, N. Y.

Application December 19, 1929, Serial No. 415,195

1 Claim. (Cl. 91—46)

My present invention is concerned with a method and apparatus which may have a wide and varied range of utility in condenser manufacturing and allied arts but which are especially intended to simplify, expedite and render more dependable, the manufacture of heavy duty wound or wrapped electrical condensers.

An object of the invention is to provide a method and apparatus by which the condensers direct from the winding machines may be continuously processed in a treating chamber until their compression, drying and impregnation has been completed, the condensers emerging in finished form with their capacities fixed and in such condition that their subsequent exposure to moisture will not cause mechanical or electrical breakdown.

Another object is to reduce the handling of the condensers to a minimum in the manufacturing process and thereby reduce manufacturing costs first by minimizing the number of electrical or mechanical rejects now resulting from frequent handling, second, by eliminating wasteful heat losses caused by transfer processes, and third, by obviating the need for the manual labor incidental to transfers. Moreover, the original charging of the treating chamber may be performed by girls instead of workmen, due to the elimination of massive racks or presses to hold the condensers during processing.

Another object is to provide a process of manufacturing condensers which will effectively eliminate present impregnation problems, such as the so-called "bleeding" of condensers or loss of liquid impregnating material apt to occur when the condensers are removed from the impregnation chambers while still hot and, at the same time, to eliminate mechanical and electrical weakness at the ends of the condensers apt to result when the condensers are improperly chilled in the impregnating chamber and the cooling, contracting and solidifying impregnating material tends to draw inwardly and to leave the ends of the conductive laminations of the condenser bare and subject to absorption of moisture.

In accordance with a preferred embodiment of the invention, a liquid and air-tight treating chamber is provided, having a door therein and including a plurality of hollow platens or shelves upon which trays of condensers to be treated are adapted to be placed. The shelves are movable relatively to each other under the influence of a hydraulic press head operative to exert or relieve pressure on the condensers in the various trays. Means is provided for circulating heating or cooling mediums through the hollow platens. Suitable piping connections permit wax or other molten impregnating material to be run into the chamber or drawn off from it, and the chamber may be evacuated by an associated suction line.

In carrying out the method, the wound condensers are placed on the trays and the trays are in turn emplaced on the shelves of the heating chamber. With the door of the chamber slightly ajar, steam or other heating fluid is circulated through the hollow shelves to thoroughly heat the condenser elements. Thereupon, the door is closed and the chamber is evacuated, to draw off substantially the last vestige of moisture or entrapped air from between the condenser laminations.

While the chamber is still evacuated, it is cut off from communication with the suction inducing means, the molten wax is indrawn by the low pressure in the chamber. Vacuum is again applied (slowly at first) for from two to four hours until all bubbling in the chamber has ceased, indicating thorough impregnation of the condensers and the removal of all air and moisture from the wax.

The next step of the process is so to cool the condensers that contracting, congealing wax will not be sucked inwardly away from the ends thereof nor will hot wax run off the condenser ends and "bleed" them. The press plunger may, through the entire process exert enough pressure on the various condensers to prevent them from moving about on the trays or from being moved about by the molten wax, but plays an especially important part in the final step of retaining the effective impregnation which has been afforded by the wax. Just before the wax reaches its freezing point, the excess is drawn off from the chamber by gravity and/or vacuum and the chamber is cooled, preferably by circulating a cooling medium through the hollow shelves, supplemented if need be by pre-dried cold air admitted into the chamber proper. This cooling congeals the wax at the exposed ends of the condensers, thereby preventing bleeding. The press now comes into action to somewhat increase the pressures on the condensers so that any tendency of the hardening wax to draw inwardly away from the ends of the condensers as it contracts and cools is adequately offset by the comparatively increased pressure on the condensers. Such pressure tends to extrude liquid wax from the centers of these elements and block any receding tendency of the congealed wax at the ends, resulting in a completely impregnated condenser with a film of wax over its ends.

The invention may be more fully understood from the following description in connection with the accompanying drawings, wherein:—

Figure 4:
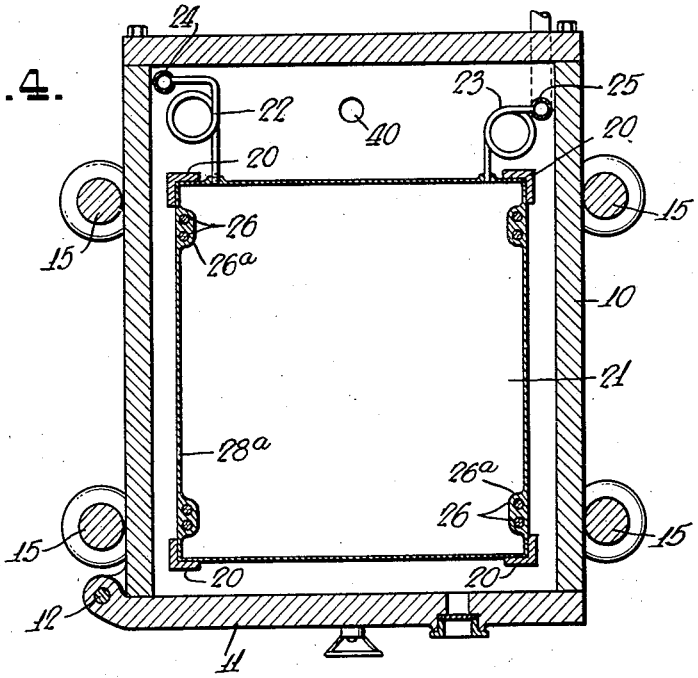
Figure 5:
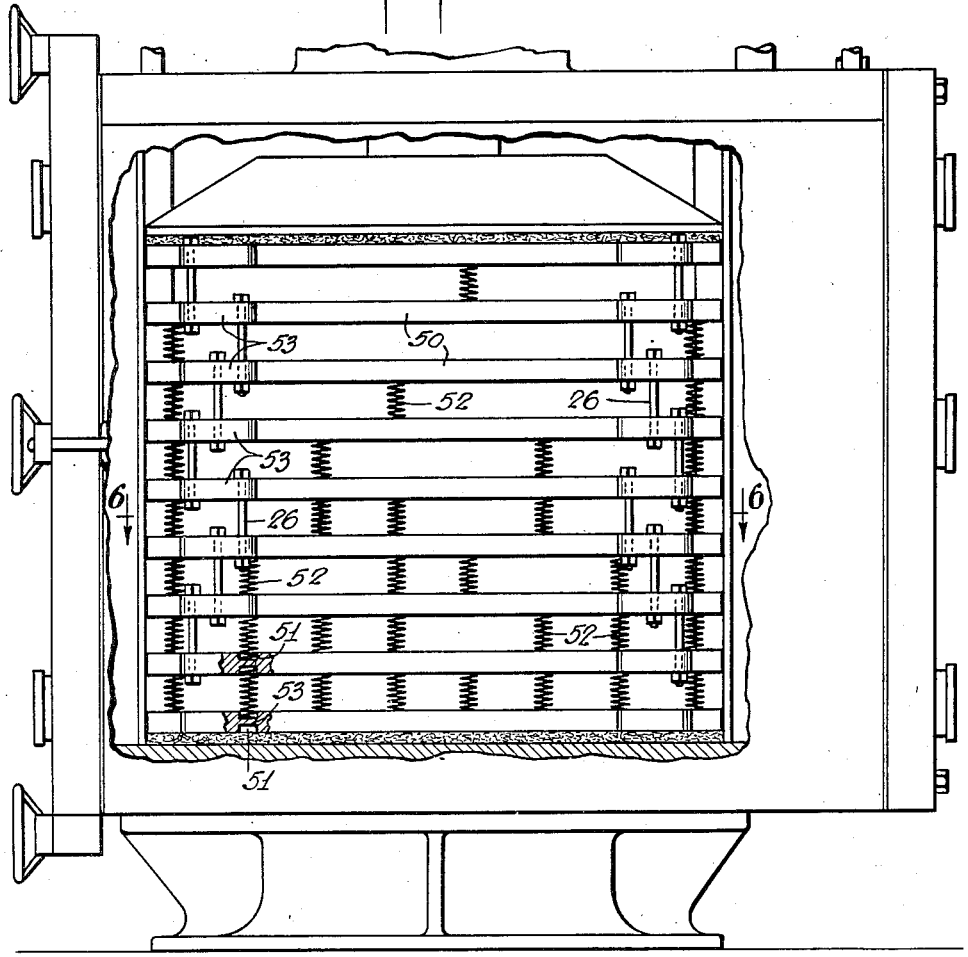
Figure 6:
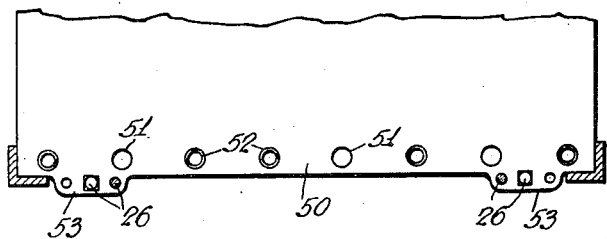

Fig. 1 is a view partly in side elevation and partly in vertical section through a treating apparatus embodying the invention, Fig. 2 is a vertical sectional view through such apparatus taken approximately at right angles to Fig. 1, Fig. 3 is a top plan view of the apparatus, Fig. 4 is a transverse sectional view taken approximately on the line 4—4 of Fig. 2, Fig. 5 is a view generally similar to Fig. 1 but illustrating a slight modification, and Fig. 6 is a fragmentary plan view of one of the shelves of the type illustrated in Fig. 5.

The treating chamber 10 is shown of generally cubical shape and provided with a door 11, which, like the chamber walls, is of massive construction. The door, opening on hinges 12, has associated therewith a number of hinged clamps 13 engageable with its edges to clamp it tightly shut and render the chamber liquid and air tight.

The chamber may be supported upon a relatively massive base 14 and a block 16 within which works the ram 17 of a hydraulic press is supported on columns 15. This ram extends through the top of the chamber 10 and is provided with a head 18 of area and shape generally corresponding to the sectional area and shape of the chamber. The block 16 and the top wall of the chamber are both provided with suitable stuffing boxes 19 through which the ram 17 travels and the head is guided at its corners in vertical angle rails 20 extending from the top to the bottom of the chamber.

The series of hollow relatively movable shelves 21 are also of square shape with their corners fitting in the guide rails. These shelves may be made in various forms built up or welded of plate stock or may comprise hollow castings, but are preferably sufficiently heavy and strong to serve as press platens for the condensers which are disposed between them. Each shelf is connected by coiled lengths of pipes 22 and 23 respectively, to the vertical inlet and outlet headers 24 and 25 of the fluid circulating system through which temperature regulating fluid may be passed as will be later described.

The wound condensers 27 are placed upon light shallow trays 28 having drain openings 28ª at their lower edges for a purpose to be later described. While the plunger 18 is in elevated position and the door 11 open, the trays are placed on the shelves 21. The trays are considerably shallower than the thickness of the condensers to be treated, so that as the press head moves downwardly the full pressure thereof will be sustained by the condensers and not by the edges of the trays.

The purpose of the resilient or coiled pipe lines is to accommodate for vertical movement of the shelves, which are hung from each other and supported by the platen or head 18. Headed bolts 26 slidably connect the corners of adjacent shelves and the uppermost shelf is hung from the press head 18.

The connective bolts are so arranged that liquid in the shelves cannot leak around them, the bolts passing through integral bosses 26ª projecting inwardly into the water spaces. In operation, as the press head is lowered, there will be no substantial pressure exerted upon any set of condensers until all of the shelves have collapsed or descended by gravity one upon the other. This collapse is progressive as the press head descends and permits the shelves serially from the bottom up to gravitationally descend upon the subjacent tray of condensers. In raising the plunger separation of the shelves is also progressive, starting with the elevation of the top shelf and subsequent picking up of the lower shelves one by one as the lost motion afforded by successive sets of connective bolts is taken up.

The vertical inlet header 24 communicates exteriorly of the chamber with a T coupling 30, coupled at opposite sides to a pair of pipes 31 and 32, equipped with suitable valves 33, 34. Pipe 32 may be connected with a suitable source of steam and pipe 31 to a suitable source of cool fluid, so that either heating or cooling mediums may be caused to flow through the various hollow shelves. In some instances, it may be desirable to introduce pre-dried cold air into the chamber for aiding in cooling the condensers and for this purpose, I have provided an air pipe 35, entering the top of the chamber and controlled by valve 36. The outlet header 25 is provided with a suitable control or drain valve 37 disposed exteriorly of the chamber. A suction line 38 communicating with the top of the chamber is provided with a valve 39 and a pipe 40 leading through the bottom of the chamber and controlled by valve 40ª, is adapted to communicate with a suitable source of supply of wax or other impregnating liquid (not shown).

A step which may be performed at this time or performed later is to lower the press head 18 a sufficient extent to slightly compress the various condensers and thereby hold them against displacement throughout the remainder of the process. However, whether the condensers are firmly held at the start of the process or not is substantially immaterial.

The next step is to circulate steam or other heating fluid through the hollow shelves with the door of the treating chamber slightly ajar and allowing the condensers to heat, usually from one to three hours. The door is then closed and bolted and while heat is still being applied, valve 39 is opened, placing the chamber in communication with a suitable source of suction, such for instance as a fan (not shown) which serves to evacuate the chamber and thoroughly free the condensers from moisture.

The circulation of the steam is, through the pipes 32 and 24, through the coiled pipes 22, through the trays, through the coiled pipe 23 and out through the header 25.

It may be stated that the principal purpose of performing the initial heating operating with the door ajar, is in order that the condensers may heat more quickly than they would if subjected to a vacuum during the initial heating stages.

Having subjected the hot condensers to vacuum for a suitable length of time, usually two to eight hours, the valve 39 is cut off and wax is flowed into the chamber, through the pipe 40. The wax is introduced slowly until it completely covers the condensers, the rising level of the wax being readily observable through sight openings 41 in the chamber door and walls.

The valve 39 is then again opened increasing the vacuum in the chamber, so that any air or moisture entrapped in the wax, will bubble out and the pure wax will flow into and penetrate into the pores of the paper thereby impregnating it, filling every minute evacuated cranny and crevice of the condensers, and forming wax-impregnated paper dielectric films between adjacent conductive condenser laminations.

After sufficient time has elapsed for thorough impregnation, say one to three hours, the valve 34 is closed to cut off the steam and the valve 33 is opened to permit cold water to circulate through the various shelves or platens. When the temperature of the wax has been reduced nearly to the freezing point, the suction line is cut off and the excess wax is drawn off through pipe 40. Excess wax in the trays drains off through openings 28$^a$.

It is at this time that the vital pressures are exerted on the condensers by the press head 18. The wax is removed from the chamber just prior to the time that the chamber becomes cold enough to congeal the remaining wax on the condensers and as the press head is moved downwardly the wax flowing from the ends of the condensers congeals and forms a film to seal the ends thereof. Thus, the condensers do not bleed because the wax solidifies as soon as it reaches the cold air at the ends of the condensers. As such wax hardens, however, it will tend to shrink inwardly from the ends of the condenser leaving them bare of impregnating material. This tendency is effectively counteracted by slightly increasing the pressure of the press at this time, such compressing pressure tending to extrude warmer and still molten wax from between the laminations of the condenser. Consequently when completely cooled under the press, the condensers will be fully impregnated with wax, throughout and will have a wax film over their ends where electrical breakdown is most apt to occur under present processes.

It will, of course, be understood that instead of circulating water or other cooling fluid through the platens, dried refrigerated air might be introduced into the chamber.

When the condensers are cooled below the freezing point of the wax, the press head is elevated, separating the various platens or shelves, the door of the chamber is opened and the trays containing the condensers are removed, the entire process of drying, compressing and impregnating having been carried out in a single chamber, without loss of heat and in a manner which materially reduces the present number of rejected condensers.

Figs. 5 and 6 illustrate a slight modification and refinement of the construction particularly, of the shelf or platen arrangement designed to assure equalization of pressure on all of the condensers being treated, more specifically to prevent the condensers in the lower trays from sustaining not only the pressure of the press but in addition thereto, the weight of the shelves above them.

In the arrangement shown, each shelf 50 is provided with a row of pockets 51 therein along two side edges thereof similar pockets being formed, if desired, in the under face of each shelf. These pockets serve to center coiled expansion springs 52 arranged between adjacent shelves and designed to support the weight of the shelves above them.

By progressively decreasing the number of springs used from the top shelf to the bottom shelf, the shelves are normally freely floated by the springs out of contact with the condensers above them and when the press head descends, equal pressure will be exerted on all of the condensers.

With this type of construction, it is preferable to form guide openings for the shelf-connecting bolts 26 in outwardly extending bosses 53 of the shelves, thereby leaving an uninterrupted area along two edges of each shelf for the reception of the springs and their centering pockets. By providing a similar number of spring receiving pockets in each shelf and placing the desired number of springs the shelves are rendered readily interchangeable.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

An apparatus for treating wound electrical condensers, including a closed treating chamber having a door therein, a plurality of spaced platens therein means for moving the various platens together to exert pressure on condensers disposed therebetween, a plurality of springs sustaining the platens in free floating position, and said springs being of uniform size and strength but varying in number between successive platens.

SAMUEL ISIDOR COLE.